(12) United States Patent  
Mikenda

(10) Patent No.: US 8,828,265 B2  
(45) Date of Patent: Sep. 9, 2014

(54) MAGNETICALLY HARD MATERIAL

(75) Inventor: Kevin Mikenda, Hermsdorf (DE)

(73) Assignee: TRIDELTA Hartferrite GmbH, Hermsdorf (DE)

( * ) Notice: Subject to any disclaimer, the term of this patent is extended or adjusted under 35 U.S.C. 154(b) by 0 days.

(21) Appl. No.: 12/640,782

(22) Filed: Dec. 17, 2009

(65) Prior Publication Data

US 2010/0155651 A1   Jun. 24, 2010

(30) Foreign Application Priority Data

Dec. 18, 2008  (EP) .................................. 08172099

(51) Int. Cl.
| | |
|---|---|
| C04B 35/40 | (2006.01) |
| C04B 35/64 | (2006.01) |
| H01F 1/00 | (2006.01) |
| C04B 35/626 | (2006.01) |
| C01G 49/00 | (2006.01) |
| H01F 41/02 | (2006.01) |
| C04B 35/26 | (2006.01) |
| H01F 1/11 | (2006.01) |
| C01G 51/00 | (2006.01) |

(52) U.S. Cl.
CPC ..... *C04B 35/2633* (2013.01); *C04B 2235/3213* (2013.01); *C04B 35/62675* (2013.01); *C04B 35/62685* (2013.01); *C01G 49/0018* (2013.01); *C01P 2002/52* (2013.01); *H01F 41/0273* (2013.01); *C01P 2006/42* (2013.01); *C01G 49/009* (2013.01); *C04B 2235/3227* (2013.01); *C04B 2235/5436* (2013.01); *C04B 2235/767* (2013.01); *C04B 35/2641* (2013.01); *C04B 2235/3277* (2013.01); *C04B 2235/656* (2013.01); *C04B 2235/5445* (2013.01); *H01F 1/11* (2013.01); *C01G 51/006* (2013.01); *C04B 35/6262* (2013.01); *C04B 2235/605* (2013.01)
USPC ..................................... 252/62.57; 252/62.63

(58) Field of Classification Search
USPC ...................... 252/62.51, 62.57, 62.62, 62.63
See application file for complete search history.

(56) References Cited

U.S. PATENT DOCUMENTS

| | | | | |
|---|---|---|---|---|
| 2003/0230832 | A1 * | 12/2003 | Masuzawa et al. | 264/427 |
| 2004/0151661 | A1 * | 8/2004 | Tenaud et al. | 423/594.2 |
| 2004/0251997 | A1 * | 12/2004 | Morel et al. | 335/302 |
| 2006/0145118 | A1 * | 7/2006 | He et al. | 252/62.59 |
| 2007/0023970 | A1 * | 2/2007 | Masuzawa et al. | 264/429 |

FOREIGN PATENT DOCUMENTS

| | | | |
|---|---|---|---|
| EP | 1465214 A1 * | 10/2004 | |
| WO | WO 03056578 A1 * | 7/2003 | |

* cited by examiner

*Primary Examiner* — Carol M Koslow  
*Assistant Examiner* — Lynne Edmondson  
(74) *Attorney, Agent, or Firm* — Husch Blackwell, LLP

(57) ABSTRACT

The invention relates to a modified strontium ferrite of the general chemical formula: $Sr_{1-x}La_xFe_{12-y}Co_yO_{19}$; in which x=y=0.01-1.00 or x=0.15 and y=x/1.6n to =x/2.6n, where n is the $Fe_2O_3$:SrO ratio used and may be 5-6. According to the invention, lanthanum and cobalt are added in an amount such that $0.14 \leq x \leq 0.145$ and $0.14 \leq y \leq 0.145$. The modified strontium ferrite thus prepared has excellent magnetic properties with regard to the remanence $B_R$, the coercive force $H_{CJ}$ and the ratio of $H_K$ to $H_{CJ}$.

5 Claims, 2 Drawing Sheets

MAGNETICALLY HARD MATERIAL

FIELD OF THE INVENTION

The invention relates to magnetically hard material and magnets produced therefrom. In particular, the invention relates to a strontium ferrite having improved magnetic properties.

BACKGROUND OF THE INVENTION

Strontium ferrites of the general formula $SrFe_{12}O_{19}$ have long been used in large quantity as magnetically hard ferrites. It is known that the magnetic properties can be influenced by adding various elements, such as, for example, cobalt and lanthanum. Thus, for example, cobalt is used for increasing the remanence $B_R$ and lanthanum for increasing the coercive force $H_{CJ}$ and the breaking strength. Such a modified strontium ferrite has the general formula: $Sr_{1-x}La_xFe_{12-y}Co_yO_{19}$ in which x=y=0.01-1.00 or x=0.15 and y=x/1.6n to =x/2.6n, and n is the $Fe_2O_3$:SrO ratio used and can assume a value of 5-6.

Apart from the exact amount of the respective additives, such a ferrite is greatly influenced by the preparation process, in particular by the conditions during sintering. Thus, it is generally found that an increase in the sintering temperature leads to an increase in the remanence $B_R$ and to a decrease in the coercive force $H_{CJ}$. Conversely, a low sintering temperature has a positive effect on the coercive force $H_{CJ}$ but reduces the remanence $B_R$. Such modified strontium ferrites are disclosed inter alia, in WO 99/34376 A1, EP 1465214 A1, US 20040151661 A1 or WO 03/056578 A1.

Moreover, EP 0964411 A1 describes a modified strontium ferrite of the abovementioned form, in which x=y=0.15 is fulfilled. This strontium ferrite has a high coercive force $H_{CJ}$ of 4500 Oe. No information is given regarding the remanence $B_R$. From this publication, it is evident that small changes in the proportions of cobalt, of lanthanum or of oxygen lead to considerable changes in the magnetic properties. Moreover, the magnetic properties can be influenced by whether lanthanum and cobalt are added to the strontium ferrite before the calcination or after the calcination.

WO 98/03864 moreover discloses such a modified strontium ferrite, extensive investigations showing that the relationship between the concentration of cobalt and lanthanum and the magnetic properties is very complex. According to this publication, a modified strontium ferrite in which the proportion of cobalt and lanthanum in which x=y=0.3 is preferred.

It was therefore an object of the invention to provide a modified strontium ferrite which has improved magnetic properties, in particular which has a high remanence $B_R$ and at the same time a high coercive force $H_{CJ}$, and in which the squareness of the demagnetization curve, expressed by $H_K/H_{CJ}$, is high. $H_K$ is the field strength at which the remanence is irreversibly reduced by 5%.

SUMMARY OF THE INVENTION

In accordance with the present invention, such a modified strontium ferrite is determined by the features of claim 1. The dependent claims relate to further advantageous aspects of the invention.

More specifically, a modified strontium ferrite of the general formula $Sr_{1-x}La_xFe_{12-y}Co_yO_{19}$, wherein $0.14 \leq x \leq 0.145$; $0.14 \leq y \leq 0.145$ is disclosed.

In one embodiment of the modified strontium ferrite x=y=0.142 is fulfilled. In such embodiments, $B_R \geq (5100 - 0.1844 * Oe^{-1} * H_a)$ G; in which $B_R$ is the remanent magnetization in G, $H_{CJ}$ being the coercive force in Oe. Further, the modified strontium ferrite wherein the ratio of $H_K$ to $H_{CJ}$ is >88%, preferably >90%.

In preferred embodiments, the modified strontium ferrite wherein a sintering process at a temperature between 1225° C. and 1245° C. was carried out during the preparation. Further the modified strontium ferrite wherein lanthanum oxide ($La_2O_3$) and cobalt oxide ($Co_3O_4$) are added after the calcination step.

A magnetically hard article of the present invention wherein it was produced from a modified strontium ferrite according to the above embodiments.

The process for the preparation of a modified strontium ferrite of the type noted above can be made using the following steps:

initial introduction of a mixture of iron oxide and strontium carbonate;

calcination of the mixture at a temperature of 1300° C.+/−20° C.;

precomminution of the calcined strontium ferrite in the dry state;

admixing of lanthanum oxide and cobalt oxide in a specified amount;

wet milling of the calcined strontium ferrite with the additives lanthanum oxide and cobalt oxide to a particle size in the range of 0.7-1.0 μm;

pressing in a magnetic field, drying and sintering of the blank thus obtained, at a temperature in the range between 1220° C. and 1250° C., preferably between 1225° C. and 1245° C.;

all such that lanthanum oxide and cobalt oxide are added in an amount such that, in the prepared sintered modified strontium ferrite, a composition according to the following formula results: $Sr_{1-x}La_xFe_{12-y}Co_yO_{19}$, in which $0.14 \leq x \leq 0.145$; and $0.14 \leq y \leq 0.145$.

Below, embodiments of the invention are described in more detail with reference to the attached figures.

DETAILED DESCRIPTION OF THE ILLUSTRATIVE EMBODIMENT

Figure 1:
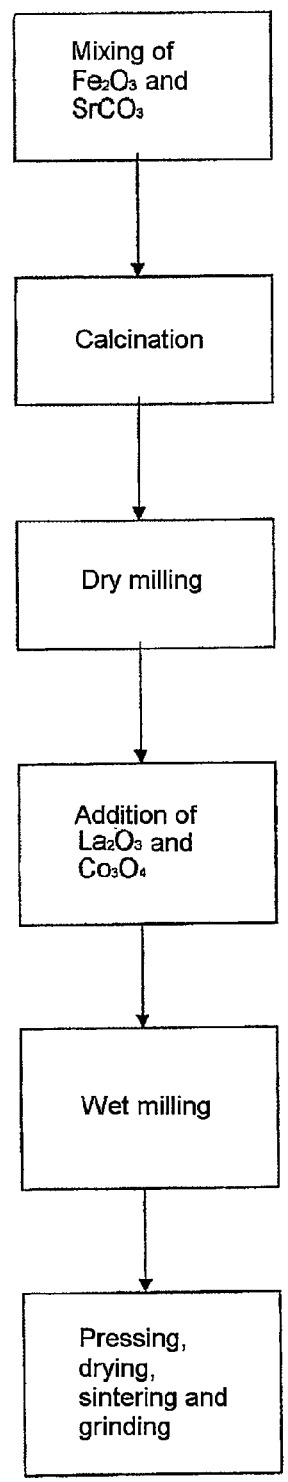
FIG. 1 shows a flow diagram of the preparation process for the modified strontium ferrite of the invention.
Figure 2:
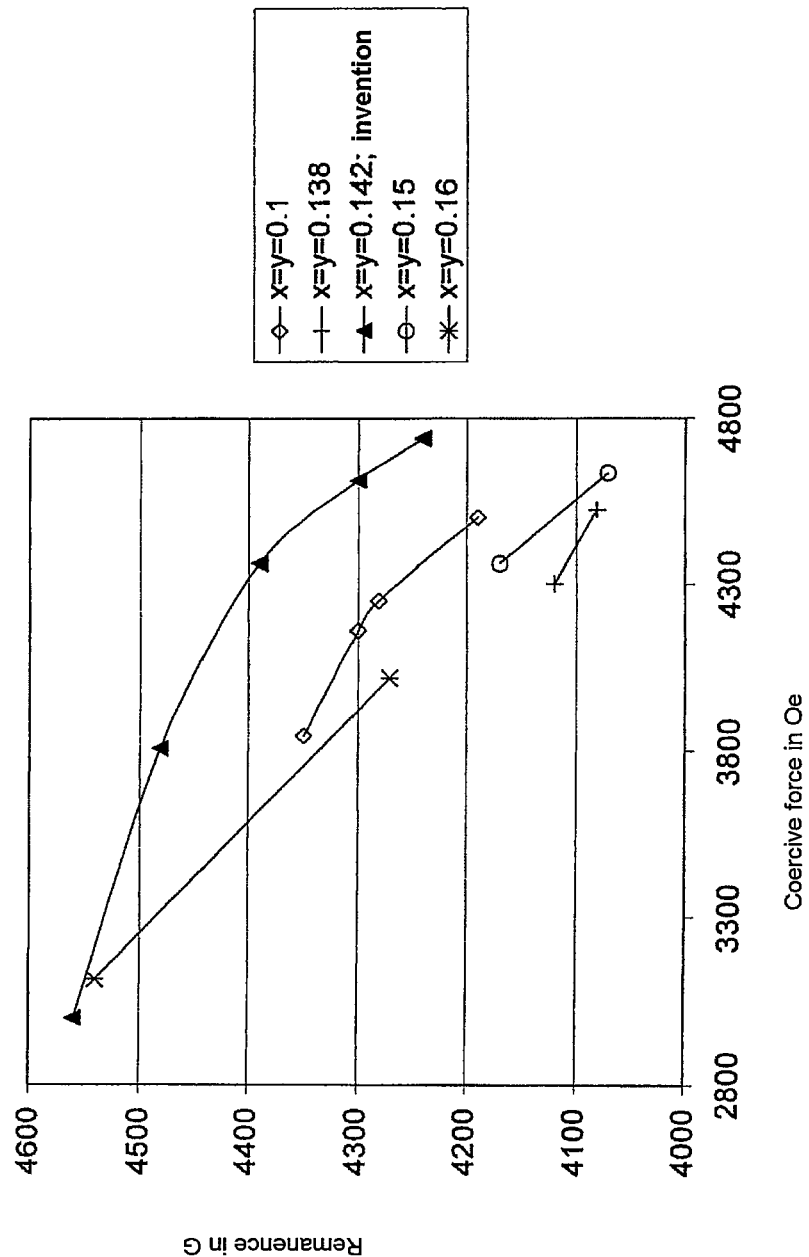
FIG. 2 shows a diagram for illustrating the advantageous magnetic properties of the strontium ferrite modified according to the invention.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

As shown in FIG. 1, the modified strontium ferrite according to the invention is prepared as follows. In a first step, an iron oxide is mixed with a strontium oxide or strontium carbonate. The mixture thus prepared is calcined in a second step at a temperature of 1300° C.+/−20° C.

In a third step, the calcined material is comminuted in the dry state to mean particle sizes of 10-30 μm. Lanthanum oxide ($La_2O_3$) and cobalt oxide ($Co_3O_4$) are added to this ferrite powder as additives.

Wet milling to particle sizes of 0.7-1.0 μm is effected as the next step.

This suspension is pressed in a magnetic field, dried and then sintered at temperatures between 1220° C. and 1250° C., preferably between 1225° C. and 1245° C. Lanthanum oxide ($La_2O_3$) and cobalt oxide ($Co_3O_4$) are added as additives to the suspension obtained as a result of the wet milling.

The blank is then dried in a magnetic field, pressed, and then sintered at temperatures between 1220° C. and 1250° C., preferably between 1225° C. and 1245° C.

First Example

A first example according to the invention was prepared using the process described above. For this purpose, lanthanum oxide and cobalt oxide in a specified ratio were added to the already calcined and precomminuted strontium ferrite during the wet milling. Thereafter, the suspension was pressed in a magnetic field of 3000 Oe, then dried, and sintered at 1225° C. The prepared product then had a composition of the formula $Sr_{1-x}La_xFe_{12-y}Co_yO_{19}$, in which $x=y=0.142$.

The main magnetic characteristics, namely the remanence $B_R$ and the polarization coercive force $H_{CJ}$ were then measured at 23° C. The measurement was effected according to the method DIN EN 60404-5.

Here, values of 4240 G for the remanence $B_R$, of 4738 Oe for the coercive force $H_{CJ}$ and of 88% for the ratio of $H_K$ to $H_{CJ}$ were found.

Second Example

The second example was identical to the first example, with the only difference that the sintering temperature was not 1225° C. but 1230° C.

The value for the remanence $B_R$ was 4300 G, the value for the coercive field $H_{CJ}$ was 4612 Oe and the ratio $H_K$ to $H_{CJ}$ was 90%.

Third Example

Once again, a modified strontium ferrite of the same composition was prepared identically to the first and second examples. The sintering temperature here was 1235° C. The resulting value for the remanence $B_R$ was 4390 G. The value for the coercive force $H_{CJ}$ was 4361 Oe. The ratio of $H_K$ to $H_{CJ}$ was 91%.

Fourth Example

In a fourth example, a sintering temperature of 1240° C. was now applied to an identical modified strontium ferrite. The value of the remanence $B_R$ increased to 4480 G while the coercive force $H_{CJ}$ decreased to 3808 Oe. The ratio of $H_K$ to $H_{CJ}$ was still 91%.

Fifth Example

In a fifth example, a sintering temperature of 1245° C. was now chosen. A modified strontium ferrite of the same composition as in the first four examples was used for this purpose. The value of the remanence $B_R$ was 4560 G. The value for the coercive force $H_{CJ}$ decreased to 3003 Oe. The ratio $H_K$ to $H_{CJ}$ was 92%.

All these modified strontium ferrites according to the invention show excellent squareness through high values of $H_K$ to $H_{CJ}$ with simultaneously very high values for both the remanence and the coercive force $H_{CJ}$. The hard ferrite magnets thus produced have substantially better magnetic properties than the conventional strontium ferrite magnets.

First Comparative Example

For comparison, a modified strontium ferrite of the formula $Sr_{1-x}La_xFe_{12-y}Co_yO_{19}$, in which $x=y=0.15$ was set, was now prepared. This modified strontium ferrite was otherwise prepared in the same manner as the strontium ferrites according to the invention, in particular as the strontium ferrite according to the invention of the second example. Here too, the sintering temperature was 1230° C.

A remanence $B_R$ of 4070 G resulted. The coercive force $H_{CJ}$ was 4637 Oe. The ratio of $H_K$ to $H_{CJ}$ decreased to 73%.

Second Comparative Example

A modified strontium ferrite having the same composition as the first comparative example was once again prepared, the sintering temperature being 1235° C. The resulting value of the remanence $B_R$ was 4170 G. The value for the coercive force $H_{CJ}$ was 4361 Oe. The ratio of $H_K$ to $H_{CJ}$ was 85%.

The values for the remanence in the first and second comparative examples are clearly substantially lower than in the case of the modified strontium ferrites according to the invention. Moreover, the ratio of $H_K$ to $H_{CJ}$ is substantially poorer.

Third Comparative Example

Once again, a modified strontium ferrite was prepared by the same process as in the examples according to the invention. However, it was specified here that $x=y=0.1$.

At a sintering temperature of 1230° C. in this comparative example, values of 4190 G for the remanence $B_R$ and of 4499 Oe for the coercive force $H_{CJ}$ resulted. The value of the ratio of $H_K$ to $H_{CJ}$ was 88%.

In this comparative example, both the remanence $B_R$ and the coercive force $H_{CJ}$ are clearly lower than in the example according to the invention at the same sintering temperature.

Fourth Comparative Example

Once again, a modified strontium ferrite having the same composition as in the third comparative example was prepared. The sintering temperature was adjusted to 1240° C. The value of the remanence $B_R$ was 4300 G, and 4159 Oe was obtained for the coercive force $H_{CJ}$. The ratio of $H_K$ to $H_{CJ}$ was 90%.

Although a very good value for the coercive force $H_{CJ}$ was achieved in this comparative example, the remanence $B_R$ was substantially below the value of the corresponding example according to the invention.

Fifth Comparative Example

A further modified strontium ferrite with the same composition as in the third and fourth comparative examples was prepared and was sintered at a temperature of 1245° C. The resulting value of the remanence $B_R$ was 4350 G. The value of the coercive force $H_{CJ}$ was 3845 and the ratio of $H_K$ to $H_{CJ}$ was still 90%.

The comparison of the third to fifth comparative example with the embodiments according to the invention shows that, according to the invention, in each case substantially better pairs of values for the remanence and the coercive force are achieved with a comparably good ratio of $H_K$ to $H_{CJ}$.

Sixth Comparative Example

In the sixth comparative example, a modified strontium ferrite of the formula $Sr_{1-x}La_xFe_{12-y}Co_yO_{19}$, in which x=y=0.16 was chosen, was prepared.

The strontium ferrite thus prepared was sintered at a temperature of 1245° C. The resulting value for the remanence $B_R$ was 4540 G. The coercive force $H_{CJ}$ was 3116 Oe. The ratio $H_K$ to $H_{CJ}$ was 94%.

The modified strontium ferrite thus prepared had good values for remanence and squareness but the value for the coercive force is very much smaller than in the example according to the invention.

Seventh Comparative Example

Once again, a modified strontium ferrite having the same composition as in the sixth comparative example was prepared and was sintered at 1235° C. Here, the resulting value of the remanence $B_R$ was 4270 G. The value for $H_{CJ}$ was 4021 Oe. The ratio $H_K$ to $H_{CJ}$ was 90%.

In the case of this composition of the strontium ferrite according to Comparative Examples 6 and 7, it was found that the dependence of the magnetic properties on the sintering temperature is very pronounced. As a result of this, even with relatively small variations in sintering temperature, the advantageous properties can no longer be guaranteed.

Eighth Comparative Example

A modified strontium ferrite of the formula $Sr_{1-x}La_xFe_{12-y}Co_yO_{19}$ was once again prepared. The value for x=y was set at 0.138. At a sintering temperature of 1230° C., the resulting value for the remanence $B_R$ was 4080 G. The value for $H_{CJ}$ was 4524 Oe. The ratio of $H_K$ to $H_{CJ}$ was 74%.

Ninth Comparative Example

A ninth comparative example was measured with the same composition as in the eighth comparative example but at a sintering temperature of 1235° C. Here, the value of the remanence $B_R$ was 4120 G while the coercive force $H_{CJ}$ was 4298 Oe. The ratio of remanence $B_R$ to saturation magnetization $B_s$ was equal to 83%.

Although the composition of the modified strontium ferrite of the eighth and ninth comparative examples is relatively close to the embodiments according to the invention, the values for the remanence $B_R$, for the coercive force $H_{CJ}$ and also for the ratio of $H_K$ to $H_{CJ}$ at the same sintering temperatures are substantially poorer than the case of the invention. Surprisingly, these values are also substantially poorer than in the third to fifth comparative examples. From this it is evident that even small changes in the composition can have substantial effects on the magnetic properties.

In the first to fifth examples according to the invention, it is found that a modified strontium ferrite having outstanding properties can be obtained over the entire range of the sintering temperature from 1225° C. to 1245° C. With regard to the remanence $B_R$, to the coercive force $H_{CJ}$ and to the ratio of remanence $B_R$ to saturation magnetization $B_S$, the strontium ferrites prepared according to the invention are excellent and are superior to those of the comparative examples.

Overall, it is found that, with the modified strontium ferrite according to the invention, it is possible, at a ratio of $H_K$ to $H_{CJ}$ of 88% or more, to achieve a pair of values for the coercive force $H_{CJ}$ and the remanence $B_R$ which satisfies the following equation:

$$B_R G^{-1} + 0.1844 * Oe^{-1} * H_{CJ} \geq 5100.$$

As an overview, Table 1 shows the composition and the magnetic characteristics of the embodiments according to the invention and of the comparative examples.

TABLE 1

|    | x = y = | $B_R$ in G | $H_{CJ}$ in Oe | Sintering temperature | $H_K/H_{CJ}$ * 100 | $B_R G^{-1}$ + 0.1844 * $Oe^{-1}$ * $H_{CJ}$ |
|----|---------|------------|----------------|----------------------|--------------------|-----------|
| E1 | 0.142   | 4240       | 4738           | 1225                 | 88                 | 5113      |
| E2 | 0.142   | 4300       | 4612           | 1230                 | 90                 | 5150      |
| E3 | 0.142   | 4390       | 4361           | 1235                 | 91                 | 5194      |
| E4 | 0.142   | 4480       | 3808           | 1240                 | 91                 | 5182      |
| E5 | 0.142   | 4560       | 3003           | 1245                 | 92                 | 5113      |
| C1 | 0.150   | 4070       | 4637           | 1230                 | 73                 | 4925      |
| C2 | 0.150   | 4170       | 4361           | 1235                 | 85                 | 4974      |
| C3 | 0.100   | 4190       | 4499           | 1230                 | 88                 | 5019      |
| C4 | 0.100   | 4300       | 4159           | 1240                 | 90                 | 5066      |
| C5 | 0.100   | 4350       | 3845           | 1245                 | 90                 | 5059      |
| C6 | 0.160   | 4540       | 3116           | 1245                 | 94                 | 5059      |
| C7 | 0.160   | 4270       | 4021           | 1235                 | 90                 | 5011      |
| C8 | 0.138   | 4080       | 4524           | 1230                 | 74                 | 4914      |
| C9 | 0.138   | 4120       | 4298           | 1235                 | 83                 | 4912      |

Although an illustrative embodiment of the invention has been shown and described, it is to be understood that various modifications and substitutions may be made by those skilled in the art without departing from the novel spirit and scope of the invention.

What is claimed is:

1. Modified strontium ferrite of the general formula $Sr_{1-x}La_xFe_{12-y}Co_yO_{19}$, wherein x=y=0.142 sintered at a temperature of between 1225° C. and 1245° C.

2. Modified strontium ferrite according to claim 1, having a ratio of $H_K$ to $H_{CJ}$ of >88%.

3. Modified strontium ferrite according to claim 1, wherein lanthanum oxide ($La_2O_3$) and cobalt oxide ($Co_3O_4$) are added after a calcination step.

4. Magnetically hard article, wherein it was produced from a modified strontium ferrite according to claim 1.

5. Modified strontium ferrite according to claim 1, having a ratio of $H_K$ to $H_{CJ}$ of >90%.

* * * * *